United States Patent [19]
Frick et al.

[11] Patent Number: 5,473,676
[45] Date of Patent: Dec. 5, 1995

[54] TELEPHONE HANDSET INTERFACE FOR AUTOMATIC SWITCHING BETWEEN VOICE AND DATA COMMUNICATIONS

[75] Inventors: Kenneth L. Frick, Westminster; Gregory Muir, Lyons; Michael M. Winseck, Jr., Boulder, all of Colo.

[73] Assignee: Radish Communications Systems, Inc., Boulder, Colo.

[21] Appl. No.: 287,207

[22] Filed: Aug. 8, 1994

Related U.S. Application Data

[63] Continuation-in-part of Ser. No. 158,994, Nov. 30, 1993, which is a continuation-in-part of Ser. No. 877,328, May 1, 1992, Pat. No. 5,365,577, which is a continuation-in-part of Ser. No. 589,203, Sep. 27, 1990, Pat. No. 5,164,982.

[51] Int. Cl.[6] .................................................. H04M 11/00
[52] U.S. Cl. ................................ 379/99; 375/8; 375/222
[58] Field of Search ........................... 379/93–100, 106, 379/442, 443, 387, 397, 380, 184, 194; 375/8, 13; 358/400, 406

[56] References Cited

U.S. PATENT DOCUMENTS

| | | | |
|---|---|---|---|
| 4,319,092 | 3/1982 | Van der Enden et al. | 379/380 |
| 4,367,374 | 1/1983 | Serrano | 379/93 |
| 4,387,271 | 6/1983 | Artom . | |
| 4,815,121 | 3/1989 | Yoshida | 379/100 |
| 4,907,267 | 3/1990 | Gutzmer | 379/442 |
| 4,932,047 | 6/1990 | Emmons et al. | 379/98 |
| 4,939,767 | 7/1990 | Saito et al. | 379/100 |
| 4,996,706 | 2/1991 | Cho | 379/93 |
| 5,014,299 | 5/1991 | Klupt et al. | 379/98 |
| 5,026,898 | 4/1992 | Nishijima | 379/442 |
| 5,164,982 | 11/1992 | Davis | 379/96 |

OTHER PUBLICATIONS

K. D. Witt, "Switch Box for Voice/Data Communication" IBM Technical Disclosure Bulletin, vol. 14, No. 5, Oct., 1971.

*Primary Examiner*—Wing F. Chan
*Attorney, Agent, or Firm*—Dorr, Carson, Sloan & Birney

[57] ABSTRACT

A telephone handset interface is inserted between the telephone handset and base for automatic switching between voice and data modes of communication. Each station includes a telephone set with a base and handset, interface circuitry, and modem. The interface circuitry includes relay switches to couple the modem to the telephone base microphone and speaker lines in data mode and to couple the telephone handset to the telephone base in voice mode. The relay switches are controlled by a sensor that monitors the on-hook/off-hook status of the modem as an indication of when the modem is preparing to transmit or receive data. The interface circuitry also includes differential amplifier circuitry coupled to the telephone base speaker lines that enables the modem to continually monitor the telephone base speaker lines. In one embodiment, each modem includes circuitry for generating a start signal to cause a remote station at the other end of the communication link to enter data mode prior to transmitting data. Similarly, each modem includes a start signal detector that is coupled to the telephone base speaker lines through the differential amplifier circuitry to detect a start signal sent by the remote unit that causes the modem to switch into data mode in preparation for receiving data. The start signal can also include signals designating the rate at which data will be transmitted and its format.

19 Claims, 12 Drawing Sheets

TELEPHONE HANDSET INTERFACE FOR AUTOMATIC SWITCHING BETWEEN VOICE AND DATA COMMUNICATIONS

RELATED APPLICATION

The present application is a continuation in part of Applicants' U.S. patent application Ser. No. 08/158,994, entitled "Telephone Handset Interface for Automatic Switching Between Voice and Data Communications" filed on Nov. 30, 1993, which is a continuation in part of U.S. patent application Ser. No. 07/877,328, filed on May 1, 1992, entitled "Improved Telecommunication Display System," now U.S. Pat. No. 5,365,577, which is a continuation in part of U.S. patent application Ser. No. 07/589,203 filed on Sep. 27, 1990, now U.S. Pat. No. 5,164,982, issued on Nov. 17, 1992.

BACKGROUND OF THE INVENTION

1. Field of the Invention

The present invention relates generally to the field of telephony. More specifically, the present invention discloses an interface system for insertion between the telephone handset and base that provides for automatic switching between voice and data communications.

2. Statement of the Problem

The present invention is intended to address two separate, but related problems in communicating both voice and data by telephone. First, it is often desirable to be able to transmit data over a single telephone line interspersed with verbal discussions between the parties. This data can be in the form of visual images relevant to the conversation. For example, a travel agent might wish to show a telephone customer a travel itinerary as they discuss it, or a broker might want to show a customer a visual confirmation of a financial transaction that the customer has just made orally over the telephone. Image data can be transmitted over a telephone line, for example, using conventional facsimile machines or the VoiceView™ products marketed by Radish Communications Systems, Inc. of Boulder, Colo. Alternatively, this data can be in the form of one or more data files to be transferred by modem between the parties' computers. A number of telephone systems have been invented in the past to allow transmission of both voice and data over a single telephone line by switching between voice and data modes, including the following:

| Inventor | Patent No. | Issue Date |
|---|---|---|
| Davis | 5,164,982 | Nov. 17, 1992 |
| Emmons et al. | 4,932,047 | June 5, 1990 |
| Yoshida | 4,815,121 | Mar. 21, 1989 |
| Artom | 4,387,271 | June 7, 1983 |

Davis discloses a telecommunications display system for accommodating both voice and data over a single telephone line. The receiving party ("subscriber") is provided with a display terminal 14 that is connected to the telephone line 22, 52 between the telephone network 50 and the base of the user's telephone 12 as shown in FIG. 1. The display terminal includes a voice/data selector that can automatically recognize digital data and switches from voice communication to data communication modes. This patent discusses one embodiment of the VoiceView™ products marketed by Radish Communications Systems, Inc.

Emmons et al. disclose an example of a conversational video phone. The device communicates both audio signals and freeze-frame video images over a standard telephone line.

Yoshida et al. disclose a telephone communication system that recognizes speech and automatically switches from data to speech transmission.

Artom discloses another example of a telephone system for combining voice and data communications over a single telephone line.

The second problem addressed by the present invention arises from the difficulty of interfacing with the multitude of existing PBX telephone systems that employ proprietary communications protocols between the PBX and its station telephones. Conventional modems, fax machines, and the like are designed to interface only with a standard analog telephone line (i.e., plain old telephone service, or POTS). In facilities having a PBX system, the common solution has been to install additional dedicated analog telephone lines that are not routed through the PBX to service these data devices. This solution adds substantial expense, unnecessary complexity, and wasted telephone line capacity.

The proprietary communications protocols commonly used by PBX systems do not extend farther than the base of the telephone set at each station. In particular, the telephone base and handset are connected by a handset cord that has a pair of speaker lines and a pair of microphone lines for analog communication with the handset speaker and microphone, respectively. Therefore, an alternative approach has been to interface the data device (e.g., a modem or fax) to the handset cord by means of a manually operated switch. The speaker and microphone lines in the handset cord appear to the data device simply as a conventional four-wire analog telephone circuit. This allows the data device to transmit and receive analog-encoded data over the handset cord without having to contend with the communication protocol of the PBX system. A number of prior art patents discuss switching arrangements to accommodate both voice and data transmission by inserting a manual switch into the handset cord, including the following:

| Inventor | Patent No. | Issue Date |
|---|---|---|
| Gutzmer | 4,907,267 | Mar. 6, 1990 |
| Serrano | 4,367,374 | Jan. 4, 1983 |

Gutzmer discloses a manual switch for insertion between a telephone handset and base to accommodate both voice and data transmission. Serrano discloses another example of a manual switch inserted between a telephone handset and base to allow both voice and data transmission. A number of similar manual switches are also on the market.

The shortcoming of a manual switch is that the user must manually operate the switch to change from voice to data transmission. In addition, in order to receive data, the sending party must verbally advise the user that data is about to be transmitted and wait while the user at the receiving end manually changes the switch to data mode. This is relatively slow and cumbersome. It also presents the possibility that data can be inadvertently lost or damaged, and voice communications can be lost or clipped due to mis-timed operation of the manual switch. This possibility is further increased if both parties are manually switching between voice and data modes.

The manual switching arrangement described in the

Gutzmer patent has been improved upon in two products manufactured by Unlimited Systems Corp., Inc., of San Diego, Calif. These products are described in the "KONEXX Model 112 Operating Instructions" and the "KONEXX Model 108 Operating Instructions." Both KONEXX devices are intended to provide an interface between the telephone base and handset for a data device, such as a fax machine or a modem. The user manually takes the telephone handset off-hook and places a call to a remote station. For example, when used with a fax machine, the user would place a call to the remote fax machine. Similarly, when used with a modem, the user would place a call to the remote modem (e.g., a bulletin board service). When the remote station answers the call, the user must then manually prompt the data device (i.e., the fax machine or modem) to go off-hook and begin communications with the remote station. The KONEXX device detects the increased current through the telephone line connecting the KONEXX device to the local data device when the data device goes off-hook and automatically couples the data device to the telephone base. The KONEXX device employs inductive coupling (e.g., transformers) to couple the local data device to the telephone line and to isolate the base microphone lines from the base speaker lines.

3. Solution to the Problem

None of the prior art references show an interface system connected between the telephone base and handset to provide automatic voice and data communications. The present invention automatically switches between voice and data communications over a single telephone line, and also circumvents the problems associated with interfacing to PBX systems that use proprietary communications protocols.

SUMMARY OF THE INVENTION

This invention provides a telephone handset interface that is inserted between the telephone handset and base for automatic switching between voice and data modes of communication. Each station includes a telephone set with a base and handset, interface circuitry, and modem. The interface circuitry includes relay switches to couple the modem to the telephone base microphone and speaker lines in data mode and to couple the telephone handset to the telephone base in voice mode. The relay switches are controlled by a sensor that monitors the on-hook/off-hook status of the modem as an indication of when the modem is preparing to transmit or receive data. The interface circuitry also includes differential amplifier circuitry coupled to the telephone base speaker lines to enable the modem to continually monitor the telephone line.

In one embodiment, each modem includes means for generating a start signal to cause a remote station at the other end of the communication link to enter data mode prior to transmitting data. Similarly, the modem includes a start signal detector that is coupled to the telephone base speaker lines through the differential amplifier circuitry to detect a start signal sent by the remote unit that causes the modem to switch into data mode in preparation for receiving data. The start signal can also include signals designating the rate at which data will be transmitted and its format.

A primary object of the present invention is to provide a telephone handset interface that automatically switches between voice and data communications.

Another object of the present invention is to provide a telephone interface for data communications that can be inserted between the telephone base and handset of virtually any telephone set to circumvent proprietary telecommunications protocols commonly found in PBX systems.

Yet another object of the present invention is to provide a telephone interface that can be readily incorporated into a wide variety of data devices, such as modems, fax machines, and VoiceView™ products.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Overview

Figure 1A:
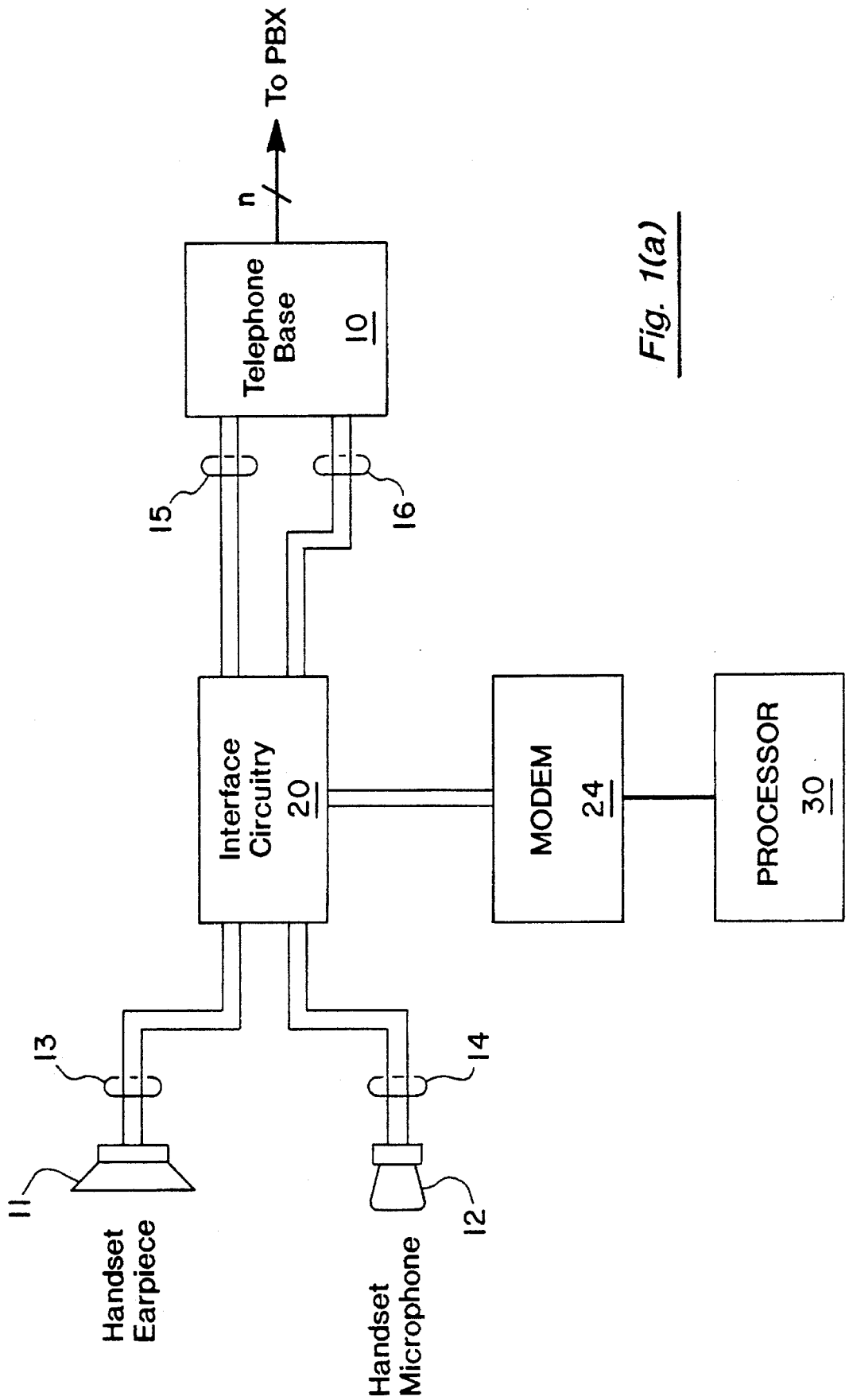
FIG. 1(a) is a schematic block diagram showing the overall invention.

Turning to FIG. 1(a), a schematic block diagram is provided showing the handset interface 20 installed between the telephone base 10 and handset 11, 12. In particular, a conventional telephone handset has an earpiece speaker 11 for converting an analog electrical signal into audible speech, and a microphone 12 associated with its mouthpiece for converting speech into an analog signal. It should be understood that other equivalent units could be substituted for the handset, such as a headset used by telephone operators or a teleconferencing speaker unit used for conference calls.

In a conventional telephone set, a handset cord normally extends between the telephone base and the handset. The handset cord typically has a pair of speaker lines and a pair of microphone lines providing full-duplex analog communication from the telephone base with the handset earpiece speaker 11 and microphone 12, respectively. The handset cord is also usually equipped with standard jacks at each end allowing the handset cord to be easily connected or disconnected from corresponding connectors in the telephone base and handset. As shown in FIG. 1(a), the telephone base 10 is connected to a PBX or telephone company central office in the conventional manner using the appropriate communications protocol for the specific telephone system.

Interface Circuitry

Interface circuitry 20 is inserted along the pair of speaker lines 15, 13 and the pair of microphone lines 16, 14 that would otherwise normally extend from the telephone base 10 to the handset speaker 11 and the handset microphone 12, respectively, as depicted in FIG. 1(a). The interface circuitry includes a number of relay switches to selectively couple the telephone handset 11, 12 and base 10 for voice communications (voice mode), and to selectively couple a modem 24 to the telephone base 10 for data communications (data mode). The interface circuitry also includes a differential amplifier enabling the modem 24 to monitor the telephone line for a preselected start signal indicating that the remote station intends to transmit data. Reception of a start signal triggers the modem 24 to switch from voice mode to data mode in preparation for receiving data from the remote station. It should be noted that the local processor 30 can also direct the modem 24 to switch to data mode in preparation for transmitting data to be supplied by the processor 30, such as a screen display, fax transmission, or data file. In either case, the modem changes from an on-hook state to an off-hook state when entering data mode. The interface circuitry 20 includes a sensor to monitor the on-hook/off-hook status of the modem and automatically change the position of the relay switches to couple the modem 24 to the telephone base 10 when the modem goes off-hook. The on-hook/off-hook sensor automatically returns the relay switches to their voice mode positions when the modem is on-hook. In the preferred embodiment, the on-hook/off-hook state of the modem is sensed by measuring the current drawn by the modem port.

Figure 1B:
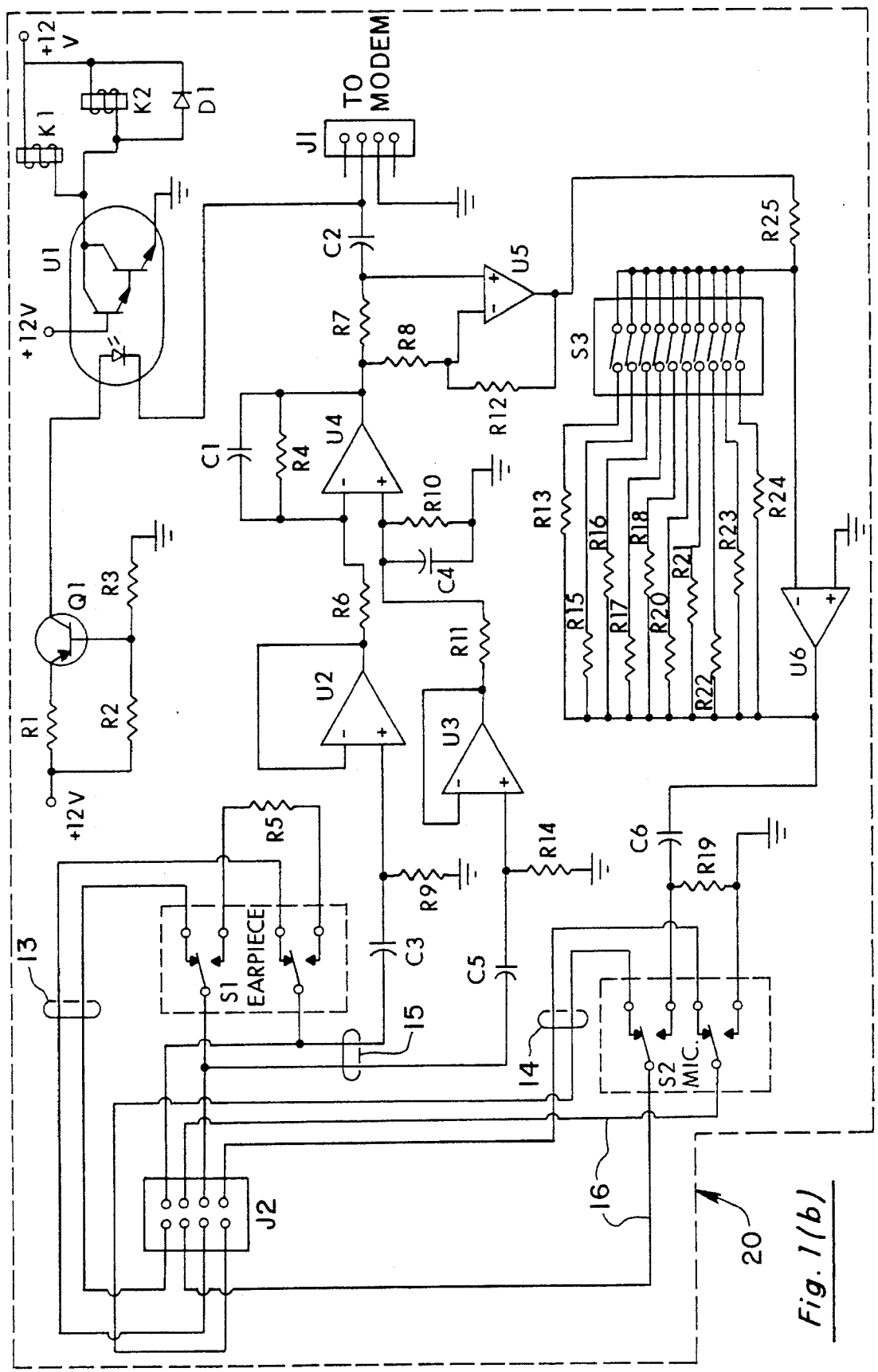
FIG. 1(b) is a schematic diagram of the handset interface circuitry 20.

FIG. 1(b) is a detailed schematic diagram of the interface circuitry 20. The interface circuitry 20 is connected to the telephone handset 11, 12 and telephone base 10 by means of at least one jack J2. In the interest of clarity, the reference numerals of the pairs of connecting wires 13–16 extending from the jack J2 within the interface circuitry in FIG. 1(b) are consistent with the reference numerals of the external wire pairs shown in FIG. 1(a). The interface circuitry 20 is also connected to the modem 24 by means of another jack J1. For a two-wire modem, the tip and ring connectors serve as both the receive port and the transmit port for the modem. Therefore, only the tip and ring connectors are connected to the interface circuitry when dealing with a two-wire modem. It should be expressly understood that a three-wire or four-wire modem could be readily substituted with only minor corresponding changes to the interface circuitry 20.

Two relay switches S1 and S2 are used to switch the interface circuitry between data mode or voice mode. The position of the relay switches S1 and S2 is determined by two corresponding coils K1 and K2 shown in FIG. 1(b). The default positions for the relay switches shown in FIG. 1(b) correspond to the voice mode of operation in which the base microphone lines 16 are directly coupled to the handset microphone lines 14 and the base speaker lines 15 are directly coupled to the handset speaker lines 13 to provide normal voice communications via the handset 11, 12. In voice mode, the base speaker lines 15 are also coupled through differential amplifier circuitry U2, U3, and U4 to the modem jack J1. The differential amplifier circuitry provides four-wire to two-wire conversion of the telephone signals for the modem 24 and also enables the tone detectors 242 and 244 in the modem 24 to continually monitor the telephone line for the start sequence. In data mode, the base speaker lines 15 are disconnected from the handset earpiece by relay switch S1. Also, relay switch S2 couples the modem to the base microphone lines 16 to allow transmission of data by the modem. The signal output by the modem is buffered by a variable gain amplifier U6. The gain is set by means of a switch S3 to select one or more of an array of resistor values R13–R24.

The interface circuitry 20 also includes means to automatically switch from voice mode to data mode whenever the modem desires to transmit or receive data. There are any number of ways to accomplish this result. For example, the interface circuitry can be directly controlled by the processor 30 or modem 24. However, in the preferred embodiment, the interface circuitry monitors the on-hook/off-hook state of the modem by measuring the current drawn by the modem through its tip and ring connectors. Consistent with standard practice in the telephone industry, the modem port appears essentially as an open circuit or a very high impedance to DC signals when the modem is on-hook. Consequently, little or no current is drawn when the modem is on-hook (i.e., in voice mode). In contrast, when the modem goes off-hook in preparation for transmitting or receiving data (i.e., data mode), the tip and ring connectors appear as a circuit having a nominal resistance. The modem will draw significant current in response to a voltage placed across the tip and ring connectors.

Transistor Q1 and resistors R1–R3 serve as a current source. When the modem goes off-hook, the modem tip and ring connectors begin to conduct significant current and the voltage across the tip and ring connectors drops to a nominal value. This current triggers the photo-amplifier U1, which in turn actuates the coils K1 and K2 to change the relay switches S1 and S2 to their data mode positions. It should also be noted that the loop current and voltage presented by the interface circuitry 20 through Q1 to the modem 24 emulates a conventional central office loop. In particular, the interface circuitry uses a current source that delivers about 20 mA into loads that can vary from 0 ohms to about 500 ohms. Typical off-hook characteristics require the modem to sink at least 20 mA with not more than 8 volts across the modem's tip and ring connectors.

The interface circuitry 20 employed in the present system offers a number of advantages. The differential amplifier circuitry enables the modem to continually monitor the telephone line for a predetermined start sequence while the modem remains on-hook. While the modem is off-hook and the interface circuitry is in data mode, the very high impedance inputs to the differential amplifier provide isolation between the telephone base microphone 16 and the handset earpiece 15 pairs. The interface circuitry 20 also provides complete isolation of the handset earpiece 11 in data mode, unlike the prior art approach discussed in U.S. Pat. No. 4,907,267 of Gutzmer, which provides only a reduced signal level from the telephone base to the handset earpiece in data mode. Finally, the interface circuitry 20 provides both gain and low-pass filter functions for receiving data. Active circuitry provides true signal power gain and not simply a voltage gain that is available when using a transformer.

Modem

It should be expressly understood that the interface circuitry 20 can be used in association with a wide variety of different types of modems. In the simplest embodiment, even a conventional modem can be used. For example, a traveler with a portable computer having a conventional modem may wish to call out through a hotel's telephone system to exchange e-mail or other data with a home office. In this scenario, the user would first unplug the existing handset cord and substitute appropriate connections between the interface circuitry 20 and the telephone base 10, handset 11, 12, and modem 24 as shown in FIG. 1(*a*). The user's portable computer is turned on and the appropriate e-mail or telecommunications software is executed to control the modem. If necessary, the software is configured for establishing a data link with the home office's computer using the appropriate communications protocol, data rate, parity, etc. The user then places an outgoing call to the home office in the conventional manner using the key pad on the telephone base 10. Alternatively, in some types of telephone systems, the modem can be used to dial the home office after the telephone has manually been taken off-hook. The user then waits until the home office computer answers the telephone call and emits a tone indicating that its modem is prepared to establish a data link. When the user hears the modem tone over the handset, he presses a key or clicks on the appropriate icon to trigger the telecommunications software to direct the local modem to go off-hook in preparation for establishing a data link with the home office computer's modem. The two modems can then exchange data over the telephone line in the conventional manner. This embodiment does not necessarily include a start sequence to automatically cause the modem to switch into data mode, but rather is completely dependent upon manual operation of the computer by the user. However, for the scenario described above, a one-time switch into data mode is typically sufficient to enable a traveler to exchange e-mail and data files.

Figure 2:
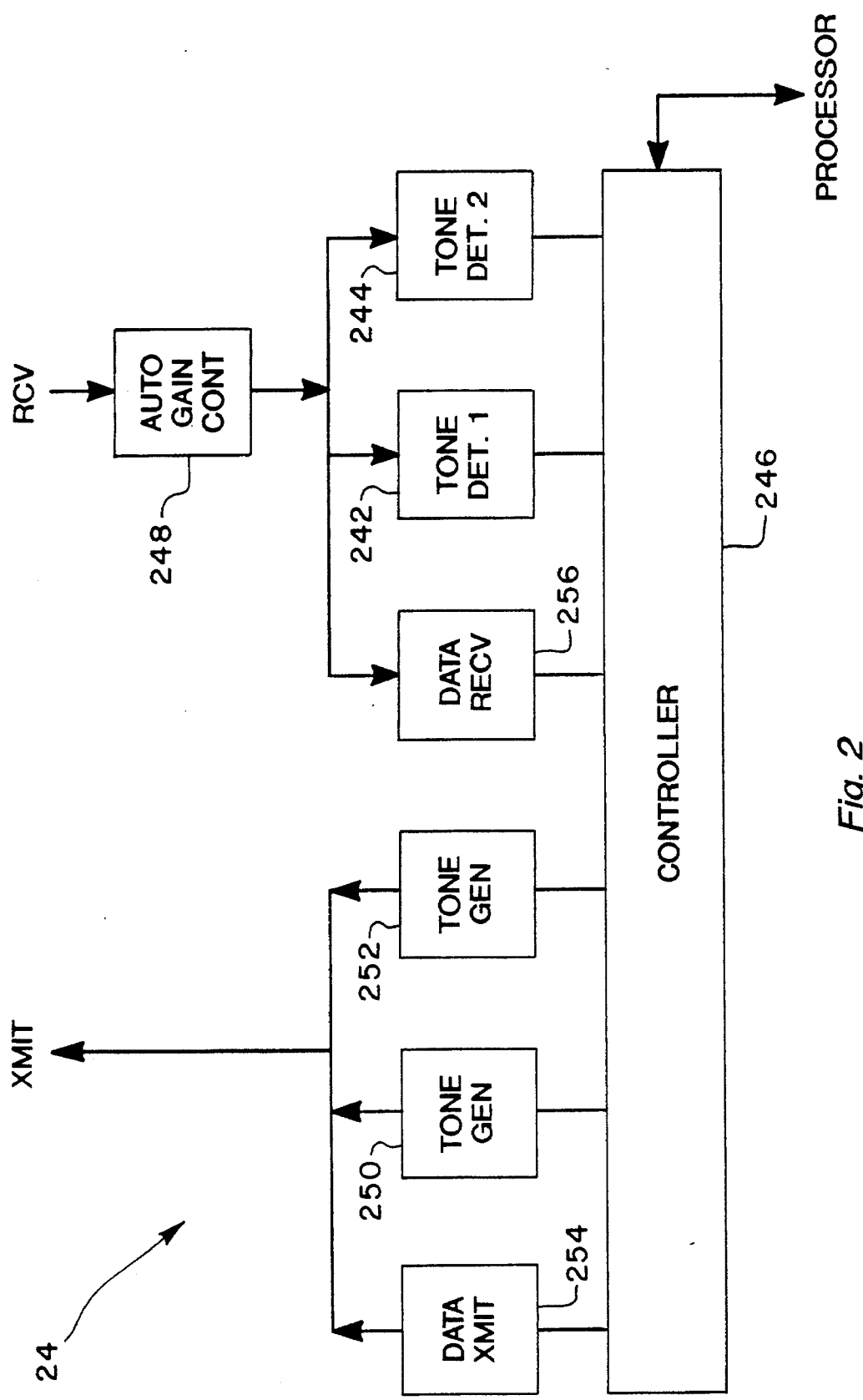
FIG. 2 is a schematic block diagram of the modem 24.

The present invention is also intended to provide a handset interface for VoiceView™ modems, as well as modems that support a VoiceView™ mode of operation plus other modes (e.g., facsimile, data, etc.). The remainder of this specification discusses these embodiments in detail. For example, the components of a modem 24 supporting the VoiceView™ protocol are shown in greater detail in the block diagram provided in FIG. 2. The signal level at the receive port of the modem is regulated by an automatic gain control amplifier 248. The analog telephone signal is demodulated by the data receive block 256 to deliver corresponding digital data to the modem's controller 246. In the preferred embodiment, the data receive block 256 can be configured by the processor 30 and modem controller 246 to selectively operate at any of a number of different data rates (e.g., V.21 300 bps FSK, V.27ter 4800 bps DPSK, or V.29 9600 bps QAM). The analog signal received by the modem is also monitored by a number of tone detectors 242 and 244 to detect predetermined tones used to signal the start of data transmission and to indicate the data transmission rate and data format. In the preferred embodiment of the present invention, the modem 24 includes tone detectors adapted to detect a start tone defined by frequencies of 2312.5 Hz and 2912.5 Hz for approximately 200 msec. This header is followed by a series of HDLC flags transmitted using the V.21 300 bps (high channel) FSK modulation scheme, which in turn is followed by a tone having one or more combinations of frequencies, such as 2312.5 Hz, 1412.5 Hz, or 811 Hz to designate a data transmission rate (i.e., 9600, 4800, or 300 bps, respectively). Additional tones can be added to the protocol to specify the format or "mode" for the data being transferred (e.g., VoiceView™, facsimile, conventional modem file transfer, etc.) To transmit, digital data is forwarded by the processor 30 through the modem controller 246 to the data transmit block 254, which modulates and transmits a corresponding analog signal. The modem controller 246 also controls a number of tone generators 250 and 252 used to generate start tones to signal the start of data transmission and to indicate the data rate and format prior to transmitting data to a remote paired unit at the other end of the telephone connection.

Operation—Voice Mode

In operation, the present system automatically switches between a voice mode and a data mode, with voice mode being the default mode of operation. In voice mode, the processor 30 controls the modem 24 to remain in an on-hook state. The current sensor in the interface circuitry senses the on-hook status of the modem and maintains the relay switches S1 and S2 in their released positions shown in FIG. 1(*b*). This directly couples the handset speaker lines 13 to the base speaker lines 15 and couples the handset microphone lines 14 to the base microphone lines 16, thereby providing normal voice communications between the telephone handset and base. Additionally, the modem is disconnected from the base microphone lines by switch S2 to prevent any extraneous signals produced by the modem 24 from interfering with voice communications. However, the receive port of the modem 24 remains coupled to the telephone base speaker lines 15 through the differential amplifier circuitry as previously discussed. This enables the tone detectors 242 and 244 within the modem 24 to continually listen in on the voice communications and detect the presence of start tones indicating that the remote unit intends to transmit data.

Operation—Data Mode

Data mode can be initiated by the processor 30 in either of two situations. The first case occurs when the processor 30 wishes to transmit data to the remote station. A simplified flowchart of this procedure is provided in FIG. 3 and will be discussed at length below. The second case occurs when the modem tone detectors 242 and 244 detect a start signal indicating that the remote unit intends to transmit. A simplified flowchart of the procedure for receiving such data is provided in FIG. 4. In either case, the processor directs the the modem 24 to change to an off-hook state. The current sensor in the interface circuitry 20 detects the increased current drawn by the modem 24 when it goes off-hook and activates the relay switches S1 and S2 to disconnect the handset speaker lines 13 from the base speaker lines 15 and to disconnect the handset microphone lines 14 from the base microphone lines 16. Instead, the modem is coupled to the base microphone lines 16.

Figure 3:
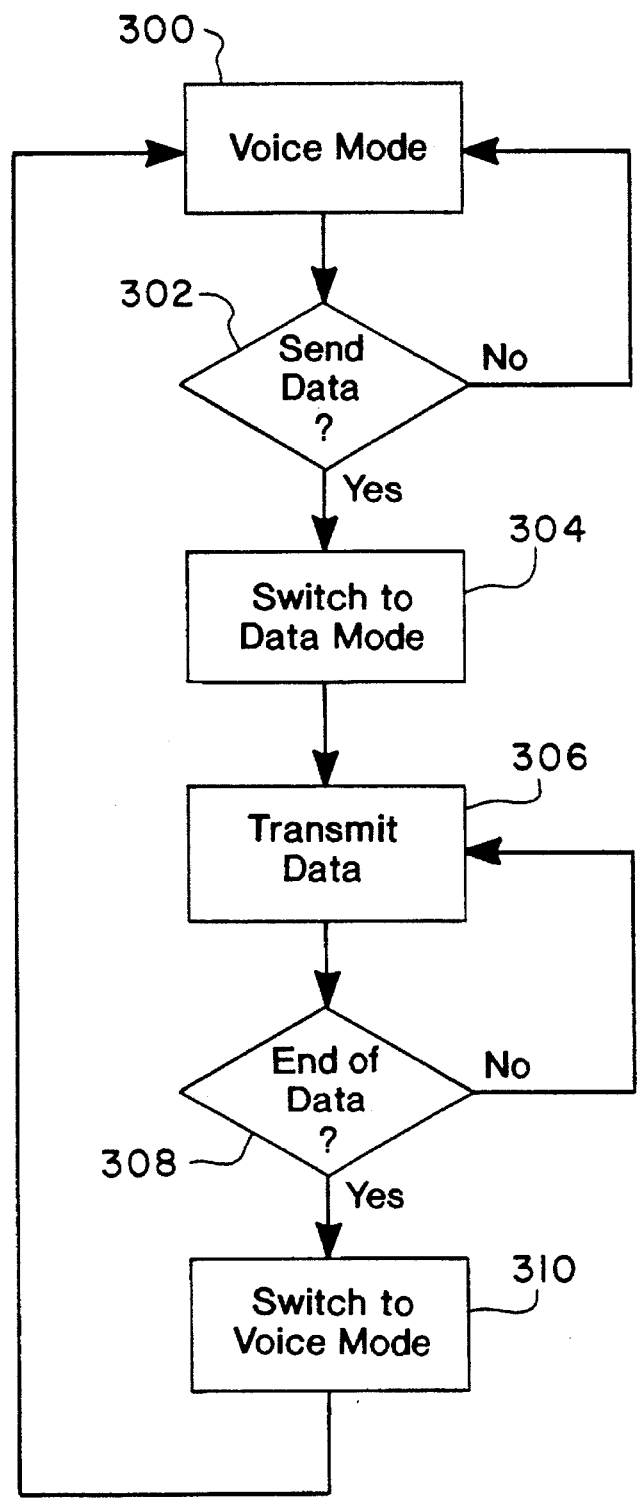
FIG. 3 is a simplified flowchart of the procedure for transmitting data.
Figure 9:
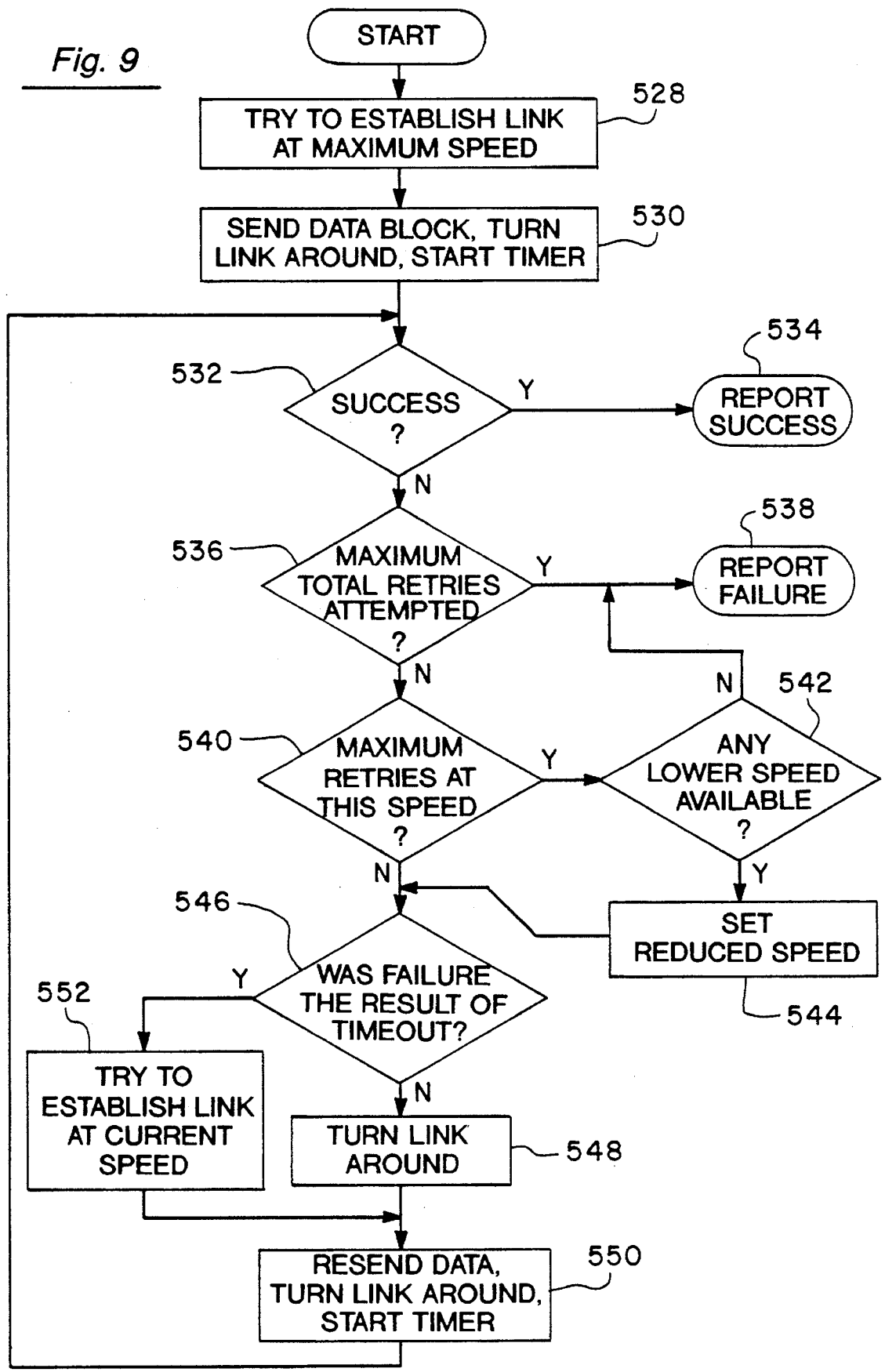
FIG. 9 is a flowchart of the retry procedure for link establishment.
Figure 10A:
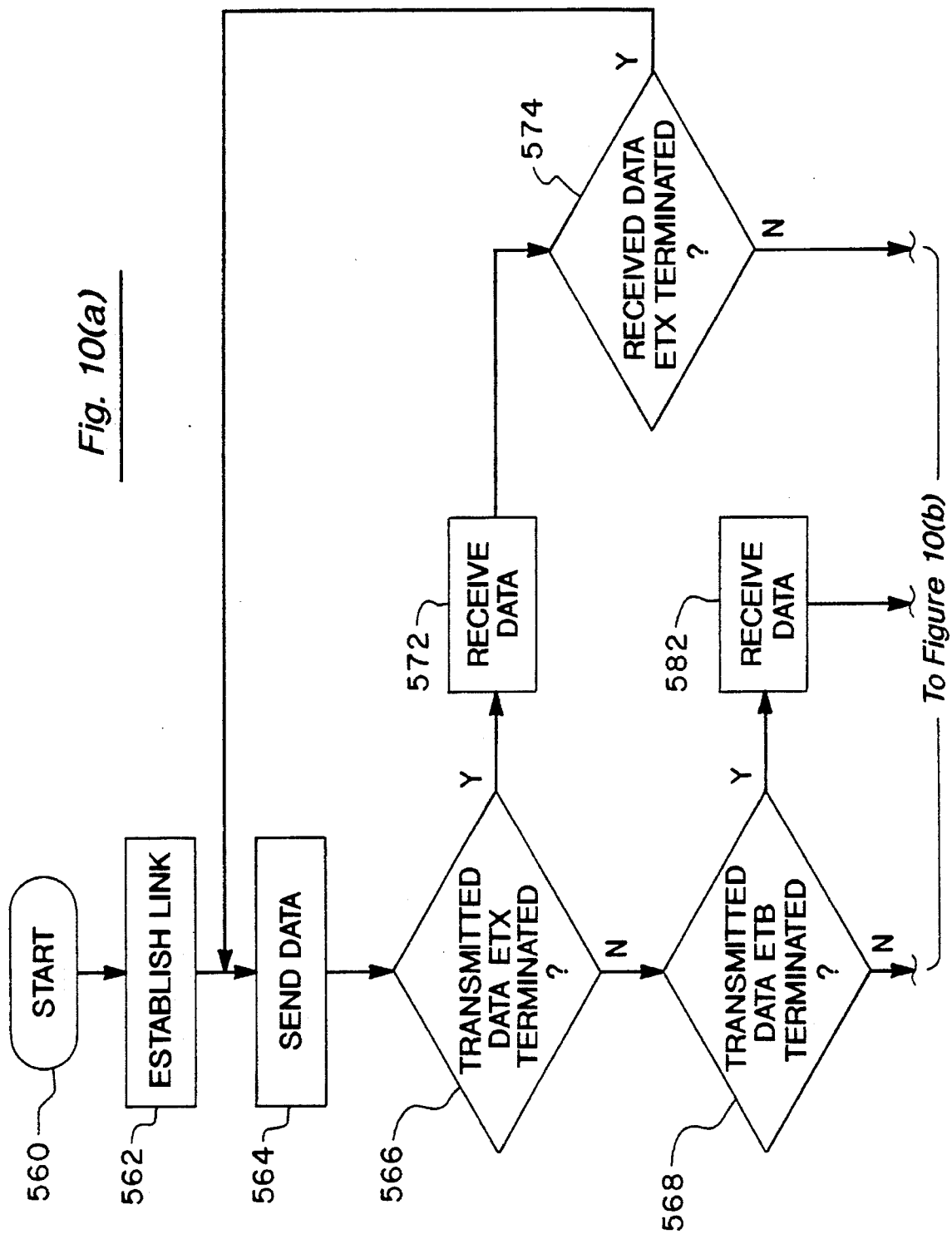
FIGS. 10(a) and 10(b) are flowcharts of the link tear-down procedure.
Figure 10B:
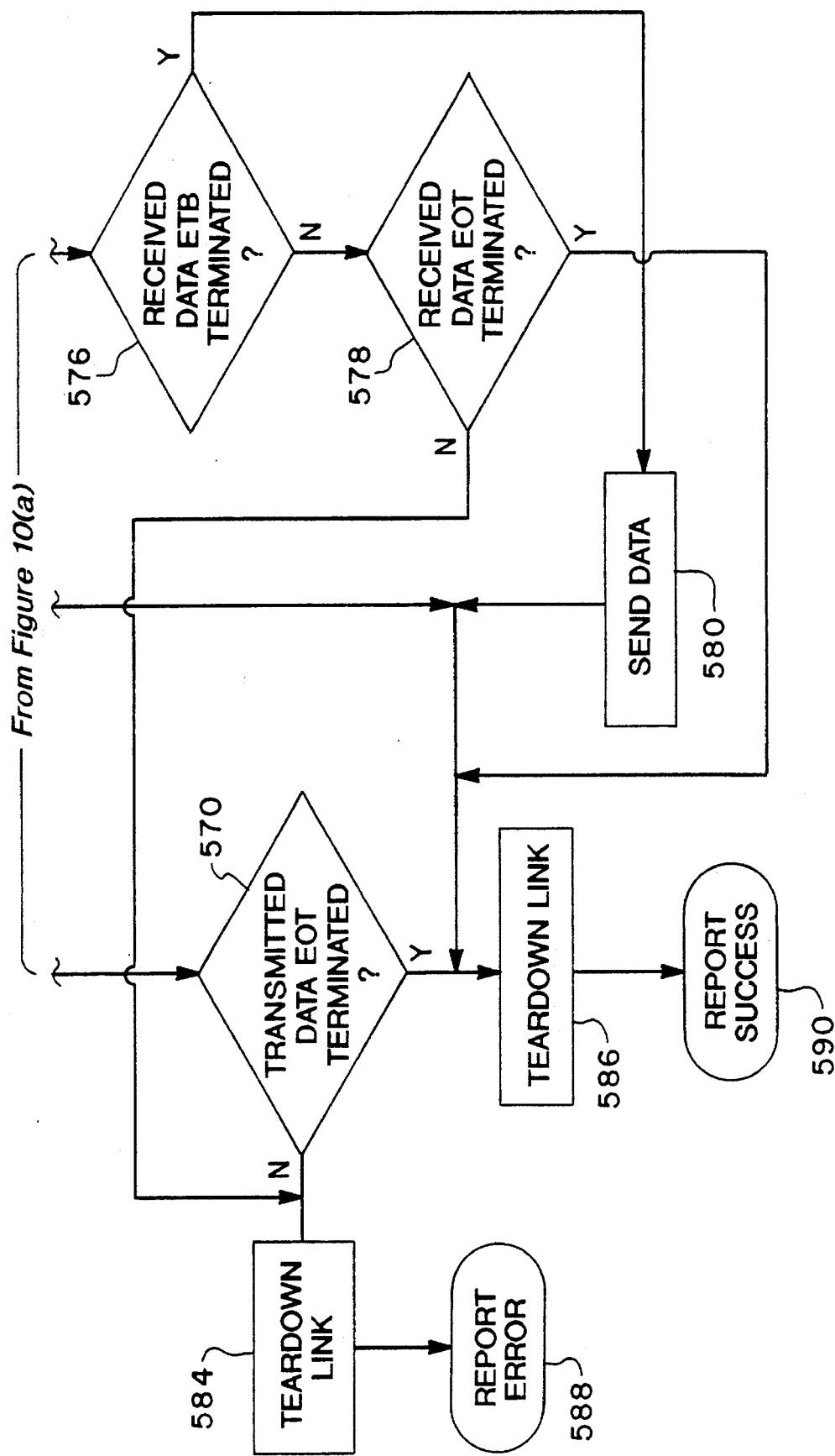

FIG. 3 is a simplified flow chart showing a general overview of the procedure for transmitted data to a remote station at the other end of a telephone connection. The transmitting station begins in the default voice mode 300 with the modem in an on-hook state and the relay switches S1 and S2 released to the positions depicted in FIG. 1(*b*). At step 302, the processor 30 determines whether the user has indicated a desire to transmit data by pressing a predetermined key or clicking on a predetermined area of the display screen using a mouse, as provided by the application layer. If so, the processor 30 directs the modem 24 to go off-hook in preparation for transmitting data. The modem's change from on-hook to off-hook is detected by the current sensor within the interface circuitry, which then changes the relay switches S1 and S2 to their respective data mode positions in step 304, as discussed above. In addition, the processor directs the modem to establish a data link with the remote station using the communications protocol illustrated in greater detail in FIG. 5. The data block provided by the sending unit's application layer is then transmitted by the modem 24 to the remote station in step 306. The receiving unit's modem acknowledges receipt of the data using the link turn-around protocol illustrated in greater detail in FIGS. 7 and 8. If necessary, the retry procedure shown in FIG. 9 is employed to retransmit the data block. In step 308, depending on the terminal character inserted at the end of the data block by the application layer, the sending unit's processor may keep the data link with the remote unit intact pending receipt of data back from the remote unit or pending additional data blocks from the sending unit's application layer to be transmitted to the remote unit. After all of the data has been transmitted, the processor returns the unit to voice mode by tearing down the data link using the procedure outlined in FIGS. 10(a) and 10(b). The modem returns to its on-hook state and the current sensor releases the relay switches S1 and S2 to their default voice mode positions shown in FIG. 1(b).

Figure 4:
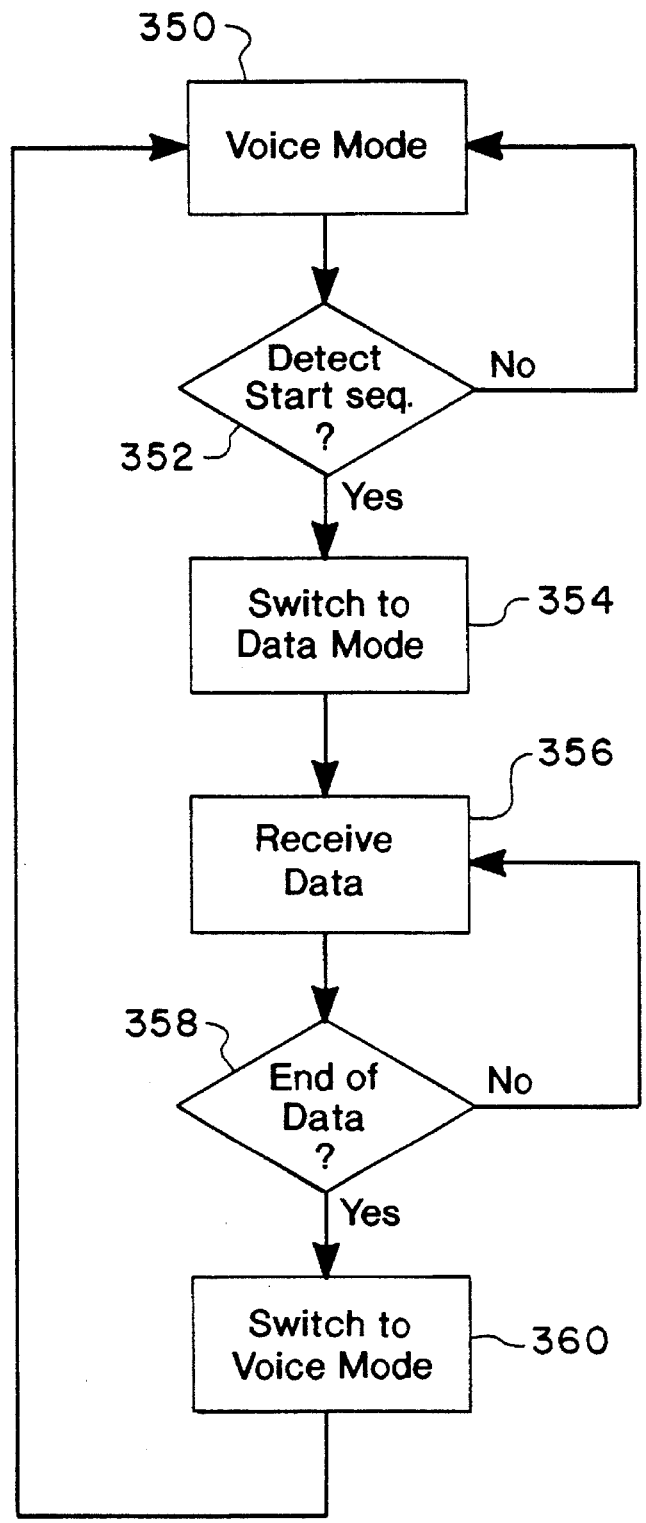
FIG. 4 is a simplified flowchart of the procedure for receiving data.

FIG. 4 is a simplified flow chart corresponding to FIG. 3 showing a general overview of the procedure for receiving data from a remote station. Again the receiving station begins at step 350 in the default voice mode 350 with the switches S1 and S2 released to the positions depicted in FIG. 1(b). If the modem detects the start tones followed by the remainder of the start sequence indicating that the remote station intends to transmit data in step 352, the processor then proceeds to convert the unit to data mode in step 354. In particular, the processor follows the communications protocol outlined in greater detail in FIG. 6 to establish a data link with the remote unit, The current sensor detects the off-hook state of the modem 24 and changes the relay switches S1 and S2 to their data mode positions, as previously discussed. After the data link has been established, the remote unit transmits its data, which is received and demodulated by the modem 24 in step 356. This data is passed through the processor 30 for use by the unit's application layer. The receiving station acknowledges receipt of the data using the link turn-around protocol illustrated in greater detail in FIGS. 7 and 8. If necessary, the retry procedure shown in FIG. 9 is employed to retransmit the data block. in step 358, depending on the terminal character at the end of the transmitted data block, the processor may keep the data link with the remote station intact pending receipt of additional data from the remote sending unit. After all of the data has been received, the processor returns the unit to voice mode by tearing down the data link using the procedure outlined in FIGS. 10(a) and 10(b), and directing the modem to return to an on-hook state. The modem's transition from off-hook to on-hook is detected by the interface circuitry's current sensor, which releases the relay switches S1 and S2 to their default voice mode positions shown in FIG. 1(b).

Figure 5:
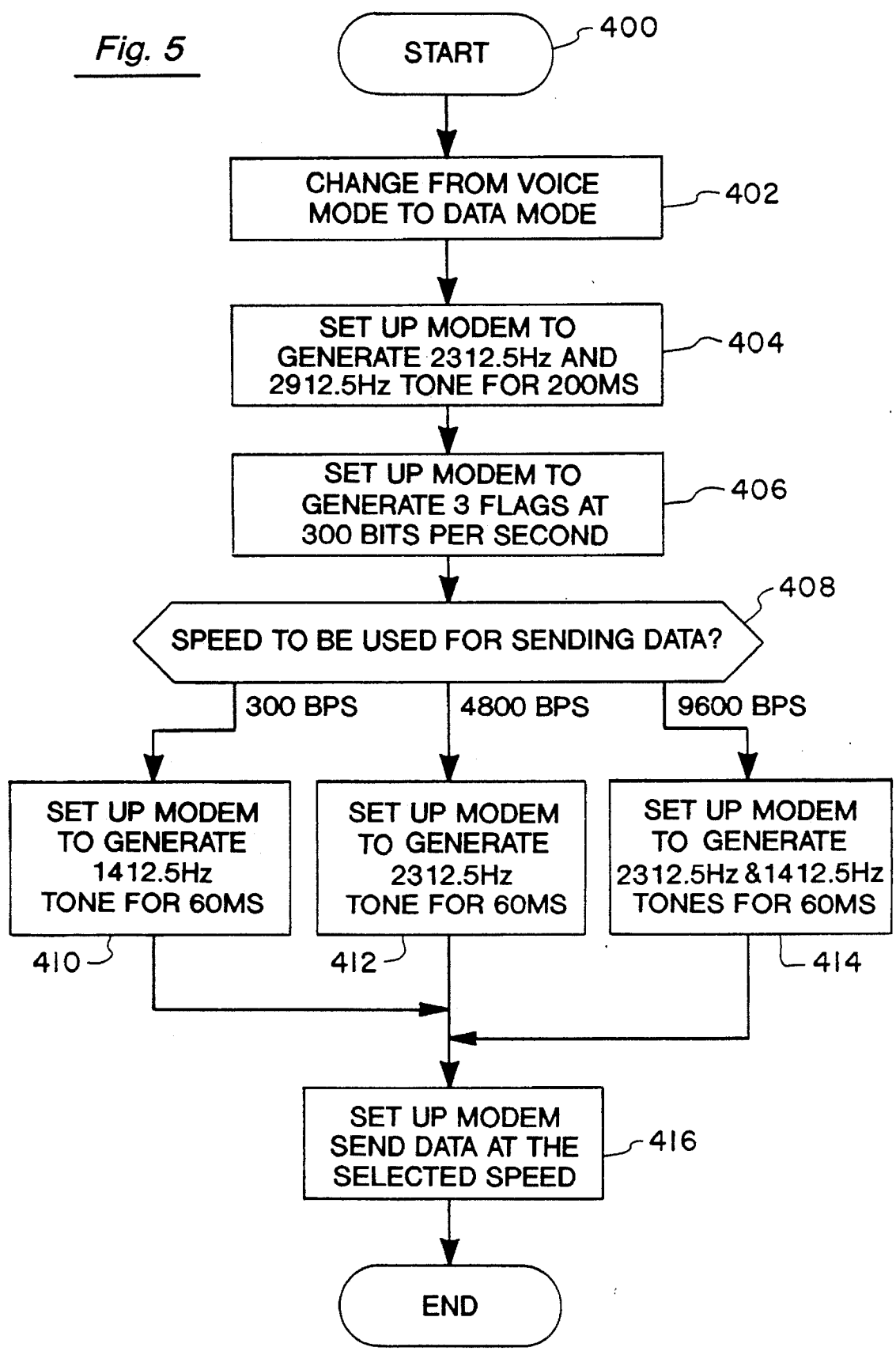
FIG. 5 is a flowchart of the procedure for establishing a link prior to transmitting data.

FIG. 5 is a more detailed flowchart of the procedure for establishing a link prior to transmitting data. The procedure to initiate link establishment to transfer data begins at step 400 with both stations in voice mode. For example, the processor 30 of the transmitting unit can be prompted to initiate link establishment when the user presses a predetermined key on the keyboard or clicks a mouse button with the cursor on a Windows screen selection, thereby requesting that a data file be transferred or that visual data on the computer display be transmitted to the remote unit. The details of the application layer and the user interface can vary widely and are outside of the scope of the present invention. For example, the present invention could be implemented as part of an IBM-family personal computer system (e.g., running MS-DOS or Windows), an Apple MacIntosh system, or a VoiceView unit communicating with a mainframe or minicomputer.

When triggered by the application layer, the processor 30 directs the modem 24 to go off-hook, which causes the interface circuitry 20 to change the position of the relay switches S1 and S2 from voice mode to data mode at step 402. The processor also sets up the modem 24 to generate the 2312.5 Hz and 2912.5 Hz start tones at step 404, and directs the modem to generate the three flags at 300 bps at step 406. Next, at step 408, the processor 30 selects the transmission rate to be used in sending data to the remote unit.

The present system can be adapted to operate at any of a wide variety of data transmission rates. As previously mentioned, the preferred embodiment of the present system can operate at either 300 bps, 4800 bps, or 9600 bps. These speeds were arbitrarily selected because they are widely used by other types of telecommunications devices. The following discussion assumes that the system has been implemented with these specific data rates. In general terms, the modem 24 in the present system can be configured by the processor 30 to operate either at a high "priority" rate (e.g., 9600 bps), a medium "recovery" rate (e.g., 4800 bps), or a low "burst" rate (e.g., 300 bps). However, other sets of speeds could be readily substituted.

The transmission speed is determined by the length of the data block to be transmitted. A short data block with few characters can be sent more time efficiently by low transmission speeds that do not require as much time to prepare the link for transmission, such as equalizer training and the like, as to prepare for higher-rate transmissions. For example, any data block that is less than four characters is preferably transmitted at 300 bps. Any data block that contains four or more characters is preferably transmitted at a transmission rate of 9600 bps, or 4800 bps if that is the current speed. Therefore, the processor 30 initially selects a transmission rate depending on the length of the data stream to be transmitted, as specified by the application layer. Before any data is transmitted, the processor 30 sets up the modem 24 to generate the data rate indicator tones at step 410, 412, or 414 so that the remote receiving station can set itself to receive data at the selected speed. Finally, the processor 30 sets up the modem 24 to send data at the selected speed, at step 416. Transmission of the data at the selected rate then follows.

Figure 6:
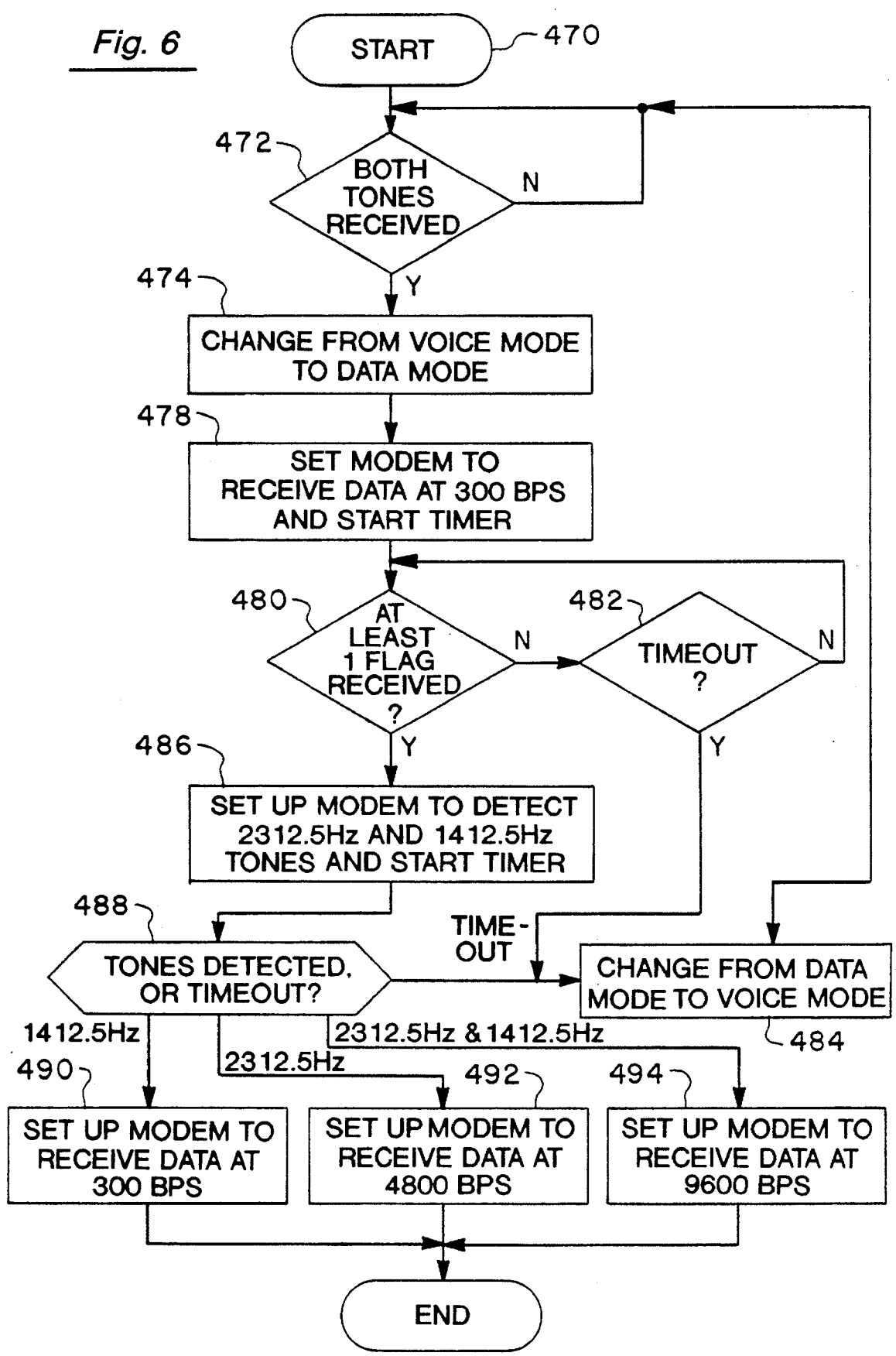
FIG. 6 is a flowchart of the procedure for establishing a link prior to receiving data (i.e., in response to the link establishment procedure initiated in FIG. 5).

FIG. 6 is a more detailed flowchart of the procedure for establishing a link prior to receiving data (i.e., in response to the link establishment procedure initiated in FIG. 5). However, it should be understood that the preferred embodiment allows bi-directional voice and data communications, which requires that both units have the capability to both transmit and receive data. Again, the procedure starts at step 470 with the assumption that both units are in voice mode. The modem 24 is set to detect the 2312.5 Hz and 2912.5 Hz start tones, as previously discussed. The first step 472 is for the processor 30 to determine whether both of the 2312.5 Hz and 2912.5 Hz tones were received by the modem. If not, the processor 30 stays in voice mode. If so, the processor 30 directs the modem 24 to go off-hook in preparation for receiving data. In turn, this causes the interface circuitry 20 to change the positions of the switches S1 and S2 from voice mode to data mode at step 474.

At step 478, the processor 30 sets the modem 24 to receive data at 300 bps and starts a timer. The timer provides an outside time limit to receive the flags before the processor returns the unit to voice mode. Otherwise, a random false signal that sounds like the start tones could cause a switch to the data mode, and leave the unit locked there waiting for flags that never come.

At step 480, the processor 30 monitors whether any of the three flags have been received. If not, step 482 checks to see whether time has run out. If not, the processor 30 continues to wait and monitor. If so, the processor 30 proceeds to step 484 and changes the unit back to voice mode. On the other hand, if at least one flag is detected at step 480, the processor 30 sets up the modem 24 at step 486 to detect the speed tones generated by the remote unit to inform the processor at which baud rate the following data will be transmitted. It also resets the maximum time limit for detecting those tones.

In step 488, the processor 30 determines that either speed-setting tones have been detected or time has run out. If time runs out with no speed tones having been detected, the processor 30 proceeds to step 484 and changes the unit back to voice mode. On the other hand, if the speed tones are detected before time runs out, the processor 30 sets up the modem 24 to receive at either 300 bps (step 490), 4800 bps (step 492), or 9600 bps (step 494) depending on the frequencies of the speed tones. The combination of frequencies of the speed tones is used to uniquely identify the rate at which data will be transmitted. Once the modem is set to receive data at the selected speed, the link is established and data is transmitted from the sending unit to the receiving unit.

Figure 7:
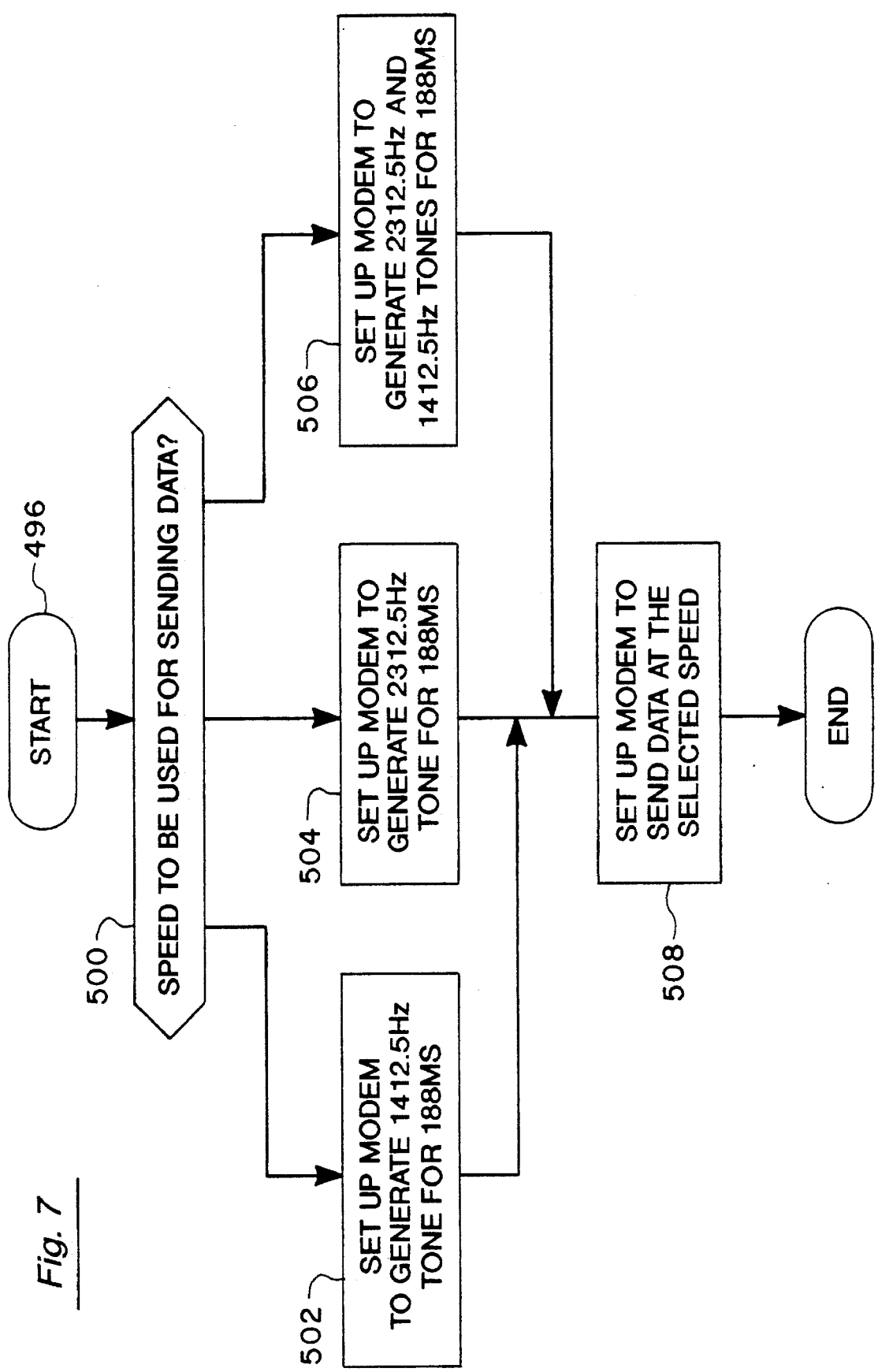
FIG. 7 is a flowchart of the link turn-around procedure for the unit receiving data.

FIG. 7 is a more detailed flowchart of the link turn-around procedure for the unit receiving data. After receiving the data, the processor 30 in the receiving station turns the link around to transmit acknowledgment data to the sending station according to the procedure in FIG. 7. Of course, having just received the data, the receiving unit is already in the data mode at the start 496 of the link turn-around procedure. The processor 30 first determines at step 500 which speed it will use to transmit the acknowledgment data according to the criteria discussed above. A simple acknowledgment data transmission is usually very short, and therefore the 300 bps rate is usually selected. In this case, the remote unit's modem is set up at step 502 to transmit a tone to designate the acknowledgment transmission rate to the sending unit. However, since the link turnaround procedure may also be used for other purposes, or for transmitting back other and longer data, steps 504 or 506 can be used to set up the modem 24 to transmit tones for 4800 bps, 9600 bps, or other speeds. Finally, after the speed tones are generated and sent, the processor 30 proceeds to the final link turn-around step 508 and sets up the modem to send the acknowledgment data at the selected speed.

Figure 8:
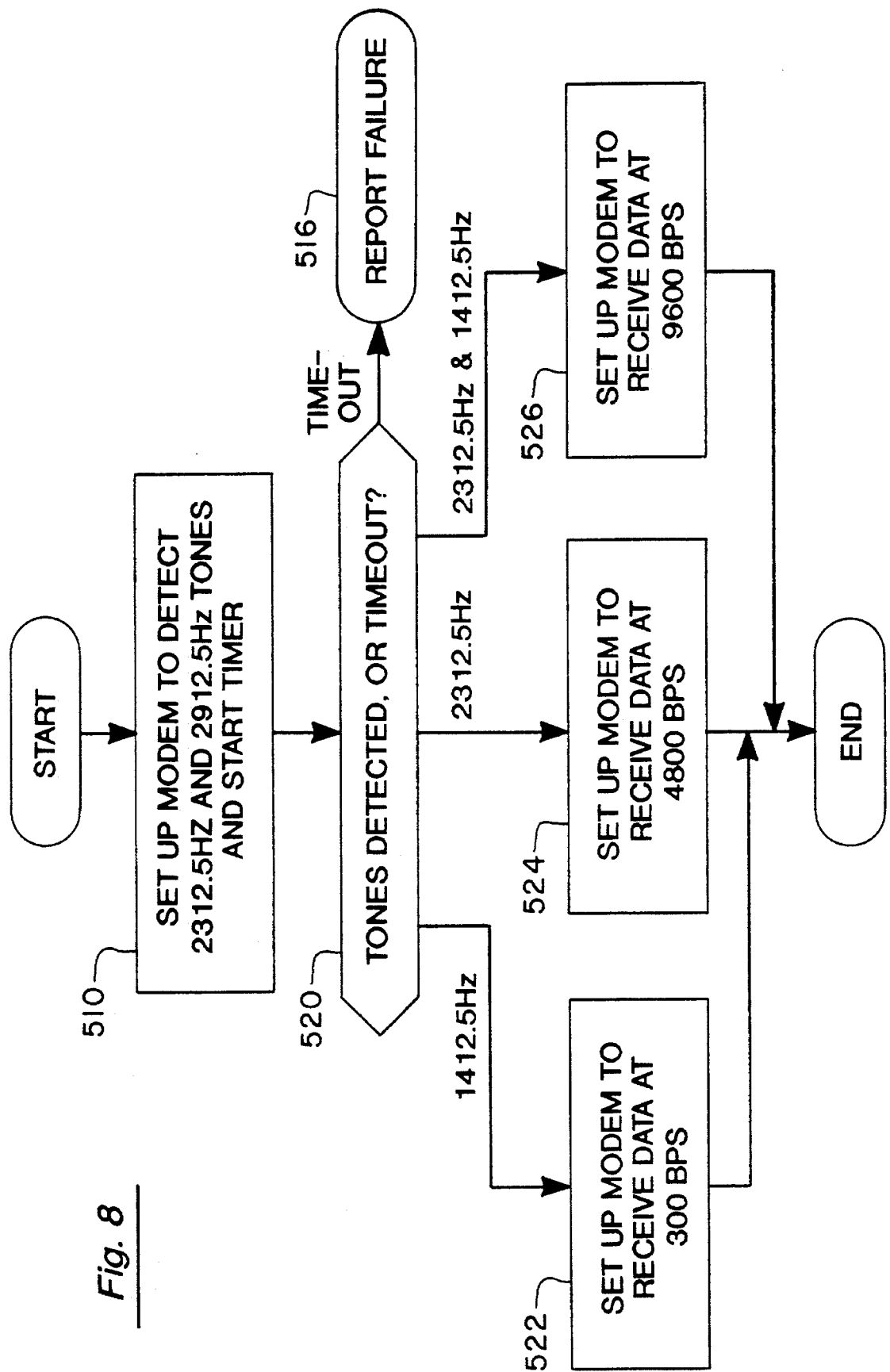
FIG. 8 is a flowchart of the link turn-around procedure for the unit transmitting data.

FIG. 8 is a more detailed flowchart of the link turn-around procedure for the other unit (i.e., the sending station). As described above, after having sent the data, the sending station's processor 30 sets up its modem 24 at step 510 to detect incoming speed tones. The processor 30 also starts the timer to measure the time elapsed from the setup of the modem 24 until the speed tones are received. At step 520, the processor 30 determines which tones were detected, and thus determines the data rate for the acknowledgment data to be received. If time has run out before this time, a failure is reported at step 516, which may initiate a retry or a return to voice mode. If the speed tones are detected, the sending unit's modem 24 is set up in step 522, 524, or 526 to receive acknowledgment data at the corresponding data rate based on the combination of frequencies of the speed tones. The data link is thereby completely turned around, and the sending unit is ready to receive the acknowledgment or other data from the remote unit.

FIG. 9 is a flowchart of the retry procedure for link establishment. At step 528, the data link is established at maximum speed, according to the procedures illustrated in FIGS. 5 and 6 as described above. The default maximum speed is 9600 bps, which in this retry procedure is always the starting retry speed. However, it does not have to be set up this way, so that retries at initial lower speeds can be used, for example, if the preceding transmissions had resulted in reduced speed retries. For example, once the speed has been reduced during a call, it is likely that the lower speed will have to be used in subsequent transmissions anyway, so it may be better to start with a lower speed. In step 530, the block of data is transmitted by the sending unit and the receiving unit turns the link around after receiving the data to send acknowledgment data back to the sending unit, as shown in FIGS. 7 and 8. If transmission of the data was successful at step 532, then the success is reported at step 534 and units return to voice mode. Success means that the link turn-around procedure of FIG. 8 ended without failure and that the acknowledgment response received from the receiving unit indicates that all data was received correctly. On the other hand, if a successful transmission is not determined at step 532, the retry procedure goes to the next step 536 to query whether the number of retries has already reached a preset maximum. It would be futile to continue retrying indefinitely to establish a data link and make a successful data transmission when it is obviously not working.

If the maximum number of retries has been reached at step 536, then failure is reported at step 538 and the unit returns to voice mode. However, if the maximum number of retries has not been reached, the next step 540 queries whether the number of retries at the current speed has reached a preset maximum. This step allows a certain number of retries at the current data rate before going to the next lower speed to retry a preset number of times at that speed, too. A retry at lower speeds might work if higher speeds do not.

If the maximum number of retries at a particular speed has been reached at step 540, then the next step 542 determines whether there are any lower speeds available. If no lower speeds are available, then a failure is reported at step 538, as before. If a lower speed is available, step 544 resets the modem data transmission rate to the next lower speed (i.e., from 9600 bps to 4800 bps). At step 546, a check is made to see whether the failure at step 532 was due to excessive time. If not, the next step 548 is to turn the link around again and then resend the data at step 550. After the data has been re-sent, the link is turned around again, the timer is restarted, and the procedure returns to step 532 to see if the last retry at sending the data was a success. On the other hand, if step 546 determines that failure was due to excessive time, step 552 skips the turn-around step 548 and goes through the link establishment and data transmission operations again. A failure that is not the result of time out occurs when the response received from the remote unit indicates that not all of the data was received correctly. A failure that is the result of time out occurs when the sending unit receives no response at all from the remote receiving unit. Eventually, this retry procedure will cycle enough to report either a success at step 534 or a failure at step 538. In either instance, the ultimate result will return both units to voice mode.

The link tear-down procedure is illustrated in FIGS. 10(*a*) and 10(*b*) from the standpoint of the sending unit. The tear-down procedure from the standpoint of the receiving unit is essentially the same. As previously discussed, the procedure for starting data mode 560 can be initiated by a user keystroke or mouse click, depending on the details of the application layer. Upon receipt of this "send" signal from the application layer, the processor 30 establishes the data link in step 562, as previously described and illustrated in FIGS. 3 and 5. This step may include some or all of the retry procedure illustrated in FIG. 9. With the data link established, the processor 30 instructs the modem 24 at step 564 to send the data to the receiving unit.

In one embodiment of the protocol used in association with the present invention, the application layer of the sending unit must decide before the end of a data transmission whether no response, one response, or open-ended exchanges will be allowed. The term "response" as used for this purpose means a response from the peer application layer of the remote unit, and not the normal acknowledgment data that is exchanged to ensure data integrity. For example, no response may be selected for the usual case in which a unit transfers a screen of data or a data file to a remote receiving unit, while one response might be appropriate if the sending unit wishes to retrieve some information from the remote unit, such as the amount of memory space available. Open-ended exchanges may be selected when the protocol is used between two units for conversational or back-and-forth transactions. This protocol therefore requires that each data transmission must be terminated with one of the following characters: ETX, ETB, or EOT. An ETX character is used to signal that an open-ended exchange is allowed. An ETB character indicates that one response is allowed. An EOT character-indicates that no response is permitted. Therefore, the sending unit's processor has to determine which response option (ETX, ETB, or EOT) has been designated by the application layer. This determination occurs in steps 566, 568, and 570 of FIGS. 10(a) and 10(b).

In step 566, the processor 30 checks the end of the data block provided by the application layer to see if it has an ETX character at the terminal end of the data. If so, the sending unit's processor 30 cannot tell whether the current data transmission that just ended was the last one expected in an exchange or whether it should expect responding data to come back from the remote receiving unit. Therefore, it does not start to tear down the data link. Instead, it leaves the sending unit in data mode and waits to receive data from the remote unit. On the other hand, if the current data transmission coming from the sending unit's application layer is not terminated with an ETX character, the processor 30 proceeds to the next step 568 to check for an ETB character, as will be described below. If the ETX character was detected at step 566 and the data link is left intact, as described above, the next step 572 would be to receive the next data transmission from the remote unit. Since both units operate under the same protocol, any data transmission received from the remote unit by the sending unit at step 572 also has to end with one of the characters ETX, ETB, or EOT. Therefore, the sending unit's processor 30 can also tell from the data transmission received from the remote unit whether the data link is to be torn down. Consequently, at step 574, the data received in step 572 from the remote unit is checked by the processor 30 for the terminal character ETX. If ETX is present, the controller still does not tear down the data link and leaves the sending unit in data mode ready to send more data, as determined by the application layer. However, if the data received in step 572 does not terminate with an ETX, the processor 30 checks for an ETB in the next step 576. If an ETB is present, the indication is that the remote unit expects to receive just one more response from the sending unit. Therefore, the processor 30 keeps the sending unit in data mode for sending one more data transmission at step 580. However, if an ETB is not detected at step 576, the processor 30 goes to the next step 578 and checks for the EOT character. If the EOT character is not present, the indication is that end of data transmission did not arrive. Therefore, the processor 30 tears down the data link at step 584 to return to voice mode and reports an error at step 588. If EOT is detected at step 578, the processor 30 knows that nothing else is expected either from or to the remote unit, and so it tears down the data link at step 586 and reports success at step 590. At the same time, the remote unit would also have torn down its data link and returned to voice mode in response to the same EOT character.

Returning to step 568, if the original data transferred by the sending unit to the remote unit did not terminate with an ETX, the processor 30 checks for the ETB character at the end of the data transmission. If the ETB is present, then one more response is expected from the remote terminal, so the data link is left intact to receive that response. The expected "one data" response from the remote unit is then received at step 582, and upon receipt, the processor 30 proceeds immediately to step 586 to tear down the link and return to voice mode. It also reports the successful data transfer at step 590.

Finally, if there was no ETB at step 568, the processor 30 checks for EOT in the data transmission at step 570. If EOT is not detected, it tears down the link to return to voice mode at step 584 and reports the error at step 588. However, if the EOT is detected at step 570, the processor 30 tears down the link at step 586 to return to voice mode and reports a successful data transfer. As mentioned above, the remote receiving terminal operates under the same protocol in the preferred embodiment of the present invention, so a separate description of the link tear-down procedure for the remote unit would be redundant.

The foregoing discussion has presented a high-level description to show the inventive concepts of this telecommunications system in a concise and understandable manner, as well as to enable persons skilled in this art to practice the invention. There are, of course, many more details involved in implementing the invention that are common and known to persons skilled in the art, such as implementing the HDLC protocol and the details of presenting a suitable user interface for the modem, the application layer, data compression algorithms, and the like.

The above disclosure sets forth a number of embodiments of the present invention. Other arrangements or embodiments, not precisely set forth, could be practiced under the teachings of the present invention and as set forth in the following claims.

We claim:

1. In a telephone communications system for automatically switching between voice and data communications over a telephone line, said system including:

a telephone set for voice communication having a handset with a pair of speaker lines and a pair of microphone lines; and having a telephone base with corresponding pairs of base microphone and speaker lines; and a modem for data communications having an off-hook state while communicating data and an on-hook state while not communicating data;

the improvement comprising a telephone handset interface having:

sensor means for sensing the on-hook/off-hook state of said modem;

switching means controlled by said sensor means for automatically switching between an off-hook state in which said handset speaker lines are decoupled from said base speaker lines and said base microphone and speaker lines are coupled to said modem, and an on-hook state in which said handset speaker lines are coupled to said base speaker lines; and differential amplifier means coupled to said base speaker lines for enabling said modem to monitor said base speaker lines.

2. The telephone communications system of claim 1, wherein said modem is switchably connected to said base microphone lines by said switching means; and wherein said switching means in said on-hook state:

(a) couples said handset speaker lines to said base speaker lines;

(b) couples said handset microphone lines to said base microphone lines; and (c) disconnects said modem from said base microphone lines; and in said off-hook state, said switching means:

(a) disconnects said handset speaker lines from said base speaker lines;

(b) disconnects said handset microphone lines from said base microphone lines; and (c) couples said modem to said base microphone and speaker lines.

3. The telephone communications system of claim 1, wherein said sensor means comprises means for detecting increased current conducted by said modem while in said off-hook state.

4. In a telephone communications system for automatically switching between voice and data communications with a remote unit over a telephone line, said system including:

a telephone set for voice communication having a handset with a pair of speaker lines and a pair of microphone lines; and having a telephone base with corresponding pairs of base microphone and speaker lines;

a modem for data communications having an off-hook state while communicating data and an on-hook state while not communicating data; and start signal detector means for detecting a preselected start signal transmitted by said remote unit over said telephone line and directing said modem to change to said off-hook state in preparation for receiving data transmitted by said remote unit;

the improvement comprising a telephone handset interface having:

sensor means for sensing the on-hook/off-hook state of said modem;

switching means controlled by said sensor means for automatically switching between an off-hook state in which said handset speaker lines are decoupled from said base speaker lines and said base microphone and speaker lines are coupled to said modem, and an on-hook state in which said handset speaker lines are coupled to said base speaker lines; and differential amplifier means coupled to said base speaker lines for enabling said start signal detector means to monitor said base speaker lines.

5. The telephone communications system of claim 4, wherein said modem is switchably connected to said base microphone lines by said switching means; and wherein said switching means in said on-hook state:

(a) couples said handset speaker lines to said base speaker lines;

(b) couples said handset microphone lines to said base microphone lines; and (c) disconnects said modem from said base microphone lines; and in said off-hook state, said switching means:

(a) disconnects said handset speaker lines from said base speaker lines;

(b) disconnects said handset microphone lines from said base microphone lines; and (c) couples said modem to said base microphone and speaker lines.

6. The telephone communications system of claim 4, wherein said sensor means comprises means for detecting increased current conducted by said modem while in said off-hook state.

7. The telephone communications system of claim 4, wherein said start signal comprises a signal indicating the transmission rate for data.

8. The telephone communications system of claim 7, wherein said modem is capable of selectively communicating data at any of a plurality of data rates; said start signal comprises a tone having a frequency selected from a corresponding plurality of predetermined frequencies to indicate one of said data rates; and said system further comprises means to set said modem data rate according to the frequency of said start signal tone.

9. The telephone communications system of claim 4, further comprising means for generating and transmitting said start signal prior to transmitting data.

10. The telephone communications system of claim 4, wherein said start signal comprises a signal indicating the format of data to be transmitted.

11. A telephone communications system for providing voice and data communications with a remote unit over a telephone line via a telephone set having a handset with a pair of speaker lines and a pair of microphone lines, and a base with corresponding pairs of base microphone and speaker lines, said system comprising:

a modem for data communications having an off-hook state while communicating data and an on-hook state while not communicating data over said telephone line;

start signal detector means for detecting a preselected start signal transmitted by said remote unit over said telephone line;

start signal generating means for transmitting a preselected start signal over said telephone line to said remote unit;

a processor in communication with said modem for directing said modem to change to said off-hook state in preparation for receiving data from said remote unit when said start signal detector means detects said start signal; said processor also directing said start signal generating means to transmit said start signal and directing said modem to change to said off-hook state in preparation for transmitting data provided by said processor; and interface circuitry having:

(a) sensor means for sensing the on-hook/off-hook state of said modem;

(b) switching means controlled by said sensor means for automatically switching between said off-hook state in which said handset speaker lines are decoupled from said base speaker lines and said base microphone and speaker lines are coupled to said modem, and said on-hook state in which said handset speaker lines are coupled to said base speaker lines; and (c) differential amplifier means coupled to said base speaker lines for enabling said start signal detector means to monitor said base speaker lines.

12. The telephone communications system of claim 11, wherein said modem is switchably connected to said base microphone lines by said switching means; and wherein said switching means in said on-hook state:

(a) couples said handset speaker lines to said base speaker lines;

(b) couples said handset microphone lines to said base microphone lines; and (c) disconnects said modem from said base microphone lines; and in said off-hook state, said switching means:

(a) disconnects said handset speaker lines from said base speaker lines;

(b) disconnects said handset microphone lines from said base microphone lines; and (c) couples said modem to said base microphone and speaker lines.

13. The telephone communications system of claim 11, wherein said sensor means comprises means for detecting increased current conducted by said modem while in said off-hook state.

14. The telephone communications system of claim 11, wherein said modem is capable of selectively communicating data at any of a plurality of data rates; said start signal comprises a tone having a frequency selected from a corresponding plurality of predetermined frequencies to indicate one of said data rates; and said system further comprises means to set said modem data rate according to the frequency of said start signal tone.

15. The telephone communications system of claim 11, wherein said start signal comprises a signal indicating the format of data to be transmitted.

16. A telephone communications system for providing voice and data communications with a remote unit over a telephone line via a telephone set having a handset with a pair of speaker lines and a pair of microphone lines, and a base with corresponding pairs of base microphone and speaker lines, said system comprising:

a modem for data communications having an off-hook state while communicating data over said telephone line in which said modem conducts current and an on-hook state while not communicating data over said telephone line in which said modem does not conduct current;

start signal detector means for detecting a preselected start signal transmitted by said remote unit over said telephone line;

start signal generating means for transmitting a preselected start signal over said telephone line to said remote unit;

a processor in communication with said modem for directing said modem to change to said off-hook state in preparation for receiving data from said remote unit when said start signal detector means detects said start signal; said processor also directing said start signal generating means to transmit said start signal and directing said modem to change to said off-hook state in preparation for transmitting data provided by said processor; and interface circuitry having:

(a) sensor means for sensing the on-hook/off-hook state of said modem by monitoring said current conducted by said modem;

(b) switching means controlled by said sensor means for automatically switching between said on-hook state in which said switching means:

(1) couples said handset speaker lines to said base speaker lines;

(2) couples said handset microphone lines to said base microphone lines; and (3) disconnects said modem from said base microphone and speaker lines; and said off-hook state in which said switching means:

(1) disconnects said handset speaker lines from said base speaker lines;

(2) disconnects said handset microphone lines from said base microphone lines; and (3) couples said modem to said base microphone lines; and (c) differential amplifier means coupled to said base speaker lines for enabling said start signal detector means to monitor said base speaker lines.

17. The telephone communications system of claim 16, wherein said start signal comprises a signal indicating the data transmission rate.

18. The telephone communications system of claim 16, wherein said modem is capable of selectively communicating data at any of a plurality of data rates; said start signal comprises a tone having a frequency selected from a corresponding plurality of predetermined frequencies to indicate one of said data transmission rates; and said system further comprises means to set said modem data rate according to said start signal tone.

19. The telephone communications system of claim 16, wherein said start signal comprises a predetermined signal indicating the format of data to be transmitted.

* * * * *